United States Patent
McLean et al.

(10) Patent No.: US 8,410,747 B2
(45) Date of Patent: Apr. 2, 2013

(54) FLEXIBLE FUEL CELL STRUCTURES HAVING EXTERNAL SUPPORT

(75) Inventors: Gerard Francis McLean, West Vancouver (CA); Jeremy Schrooten, Mission (CA)

(73) Assignee: Societe BIC, Clichy (FR)

( * ) Notice: Subject to any disclaimer, the term of this patent is extended or adjusted under 35 U.S.C. 154(b) by 1033 days.

(21) Appl. No.: 11/327,516

(22) Filed: Jan. 9, 2006

(65) Prior Publication Data
US 2006/0127734 A1   Jun. 15, 2006

Related U.S. Application Data

(63) Continuation-in-part of application No. 11/185,755, filed on Jul. 21, 2005, now Pat. No. 7,474,075.

(60) Provisional application No. 60/589,583, filed on Jul. 21, 2004.

(51) Int. Cl.
*H02J 7/16* (2006.01)
*H01M 8/00* (2006.01)

(52) U.S. Cl. ........ 320/101; 320/160; 320/161; 429/400; 429/517

(58) Field of Classification Search .................. 320/101, 320/134, 135, 136, 137, 139, 140, 160, 161; 429/127, 508, 509, 498, 479, 400, 162, 163, 429/457, 492, 499, 529, 480, 482, 483, 517
See application file for complete search history.

(56) References Cited

U.S. PATENT DOCUMENTS

| | | | |
|---|---|---|---|
| 5,336,570 A | 8/1994 | Dodge, Jr. | |
| 5,759,712 A | 6/1998 | Hockaday | |
| 5,989,741 A * | 11/1999 | Bloomfield et al. | 429/465 |
| 6,127,058 A * | 10/2000 | Pratt et al. | 429/480 |
| 6,131,851 A | 10/2000 | Williams | |
| 6,211,643 B1 | 4/2001 | Kagatani | |
| 6,268,077 B1 | 7/2001 | Kelley et al. | |
| 6,326,097 B1 | 12/2001 | Hockaday | |
| 6,447,945 B1 | 9/2002 | Streckert et al. | |
| 6,544,400 B2 | 4/2003 | Hockaday et al. | |
| 6,620,542 B2 | 9/2003 | Pan | |
| 6,908,702 B2 | 6/2005 | McElroy et al. | |
| 7,201,986 B2 | 4/2007 | McLean | |
| 7,378,176 B2 | 5/2008 | McLean et al. | |
| 7,569,304 B2 * | 8/2009 | Irvine et al. | 429/94 |
| 2002/0106555 A1 * | 8/2002 | Langan | 429/127 |
| 2002/0182475 A1 * | 12/2002 | Pan | 429/41 |

(Continued)

FOREIGN PATENT DOCUMENTS

JP   2003-123792 A   4/2003
WO   03067693 A2   8/2003

OTHER PUBLICATIONS

"U.S. Appl. No. 11/185,755, Advisory Action mailed Jun. 20, 2007", 3 pgs.

(Continued)

*Primary Examiner* — Edward Tso
*Assistant Examiner* — Alexis Boateng
(74) *Attorney, Agent, or Firm* — Schwegman Lundberg, & Woessner, P.A.

(57) ABSTRACT

Fuel cell components provide fuel cells on a flexible sheet that defines a wall of a flexible plenum. An external support structure limits expansion of the plenum in response to forces exerted by a pressurized reactant. The external support structure may comprise a portion of a housing of a portable device. Cathodes of the fuel cells may be accessible from an outside of the flexible sheet and exposed to ambient air while anodes of the fuel cell are accessible from an inside of the flexible sheet and exposed to a fuel, such as hydrogen gas.

27 Claims, 18 Drawing Sheets

U.S. PATENT DOCUMENTS

| | | | |
|---|---|---|---|
| 2003/0025234 | A1 | 2/2003 | Gough et al. |
| 2003/0124409 | A1* | 7/2003 | Cramer et al. .................. 429/37 |
| 2004/0121122 | A1* | 6/2004 | Reynolds, III et al. ........ 428/137 |
| 2004/0164702 | A1 | 8/2004 | Holmes |
| 2005/0008918 | A1 | 1/2005 | Nakakubo et al. |
| 2005/0014054 | A1* | 1/2005 | Champion ....................... 429/34 |
| 2005/0196666 | A1* | 9/2005 | Gottesfeld et al. ............ 429/127 |
| 2005/0249987 | A1 | 11/2005 | McLean |
| 2005/0250004 | A1 | 11/2005 | McLean et al. |
| 2006/0127734 | A1 | 6/2006 | McLean et al. |
| 2006/0166061 | A1 | 7/2006 | Kimura et al. |
| 2007/0090786 | A1 | 4/2007 | McLean |

OTHER PUBLICATIONS

"U.S. Appl. No. 11/185,755, Appeal Brief filed Oct. 29, 2007", 35 pgs.

"U.S. Appl. No. 11/185,755, Final Office Action mailed Feb. 21, 2007", 9 pgs.

"U.S. Appl. No. 11/185,755, Interview Summary dated Oct. 18, 2006", 2 pgs.

"U.S. Appl. No. 11/185,755, Non-Final Office Action mailed Jan. 25, 2006", 8 pgs.

"U.S. Appl. No. 11/185,755, Non-Final Office Action mailed Jul. 13, 2006", 8 pgs.

"U.S. Appl. No. 11/185,755, Notice of Allowance mailed Aug. 29, 2008", 6 pgs.

"U.S. Appl. No. 11/185,755, Response Filed Apr. 25, 2006 to Non-Final Office Action mailed Jan. 25, 2006", 5 pgs.

"U.S. Appl. No. 11/185,755, Response filed Jun. 1, 2007 to Final Office Action mailed Feb. 21, 2007", 10 pgs.

"U.S. Appl. No. 11/185,755, Response filed Dec. 13, 2006 to Non-Final Office Action mailed Jul. 13, 2006", 9 pgs.

"U.S. Appl. No. 11/185,755, Non-Final Office Action mailed Jan. 25, 2008", 10 pgs.

"U.S. Appl. No. 11/185,755, Response filed Apr. 24, 2008 to Non-Final Office Action mailed Jan. 25, 2008", 10 pgs.

* cited by examiner

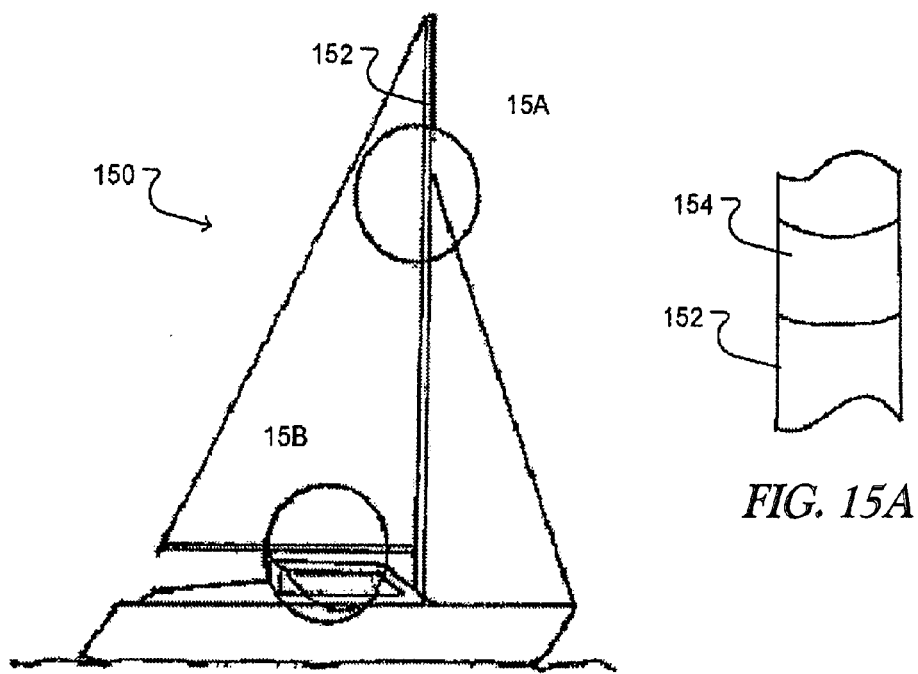
*FIG. 15*
*FIG. 15A*
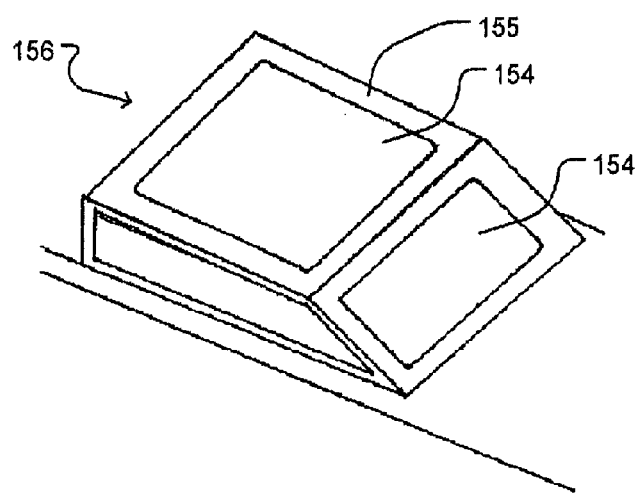
*FIG. 15B*

FLEXIBLE FUEL CELL STRUCTURES HAVING EXTERNAL SUPPORT

CROSS-REFERENCE TO RELATED APPLICATIONS

This application claims the benefit under 35 U.S.C. §119 of U.S. patent application No. 60/589,583 filed on 21 Jul. 2004 and entitled CONFORMABLE FUEL CELLS. This application is a continuation-in-part of U.S. patent application Ser. No. 11/185,755 filed on 21 Jul. 2005 and entitled DEVICES POWERED BY CONFORMABLE FUEL CELLS, both of which are hereby incorporated by reference herein.

TECHNICAL FIELD

The invention relates to electrochemical cells such as fuel cells.

BACKGROUND

Fuel cells are electrochemical devices that can convert suitable hydrogen or hydrocarbon fuels directly into electrical power. As such, fuel cells have promise as a way to obtain electricity from clean fuels. Fuel cells have been proposed as power sources for devices as diverse as automobiles, personal computers and flashlights.

There are a wide range of known fuel cell constructions. In a typical fuel cell system, multiple unit cells are associated together to make a fuel cell stack. Manifolds are provided to carry fuel and oxidant to anode and cathode regions of the fuel cell. Mechanisms for distributing these reactants and collecting the resulting reaction products (electrical current, water, heat) are also provided. In a fuel cell, the fuel is physically isolated from the oxidant. Sealing of the structure to prevent mixing of the reactants is always required.

Most fuel cell systems have the form of a rigid block of adjacent fuel cells made up of an alternating structure of rigid plates. The plates permit separate flows of reactants to thin unit fuel cells to produce electricity. Seals between the plates prevent leakage.

A problem with the designs of some fuel cell systems is that they are made up of large numbers of separate parts such as membrane electrode assemblies, current collectors, seals, and the like. This makes such fuel cell systems time-consuming and expensive to make. Fuel cell systems that have many separate cooperating parts can also be prone to failure due to leaks, electrical short circuits, electrical open circuits or the like. Another problem with some existing fuel cell designs is that the designs cannot be easily adapted to permit the fuel cell system to be shaped to fit in an available space.

For large stationary devices, the volume requirements of conventional fuel cell stacks is relatively inconsequential. However, in portable applications, space is at a premium. In order to maximize power to a portable device, the active area of fuel cells provided to power the device must be large. In order to maximize operational lifetime, the volume available for fuel storage must be maximized. Current portable fuel-cell-powered devices are designed around the space required by the fuel cells and fuel storage just like their battery-powered counterparts are designed around the space required by batteries. This has typically resulted in undesirably bulky devices.

There is a need for fuel cell systems and other electrochemical cells that are reliable and cost effective and provide design flexibility. There is a particular need for fuel cell systems that are useful for powering portable electronic devices.

SUMMARY OF THE INVENTION

One aspect of this invention provides fuel cell apparatus comprising a plenum enclosed by flexible walls. At least one of the flexible walls comprises a first flexible sheet supporting one or more fuel cells. The fuel cells have anodes accessible from a first side of the first flexible sheet and cathodes accessible from a second side of the first flexible sheet. The apparatus includes an inlet for connecting the plenum to a source of a reactant and an external support structure disposed to limit outward expansion of the plenum.

Further aspects of the invention and features of specific embodiments of the invention are described below.

BRIEF DESCRIPTION OF THE DRAWINGS

In drawings which illustrate non-limiting embodiments of the invention and which are not drawn to scale.

FIG. 15 illustrates a sailboat having fuel cell assemblies incorporated into its mast;

FIG. 15A shows a sailboat mast that incorporates fuel cell assemblies; and,

FIG. 15B shows a boat cabin having fuel cell assemblies incorporated into its roof.

DESCRIPTION

Figure 1:
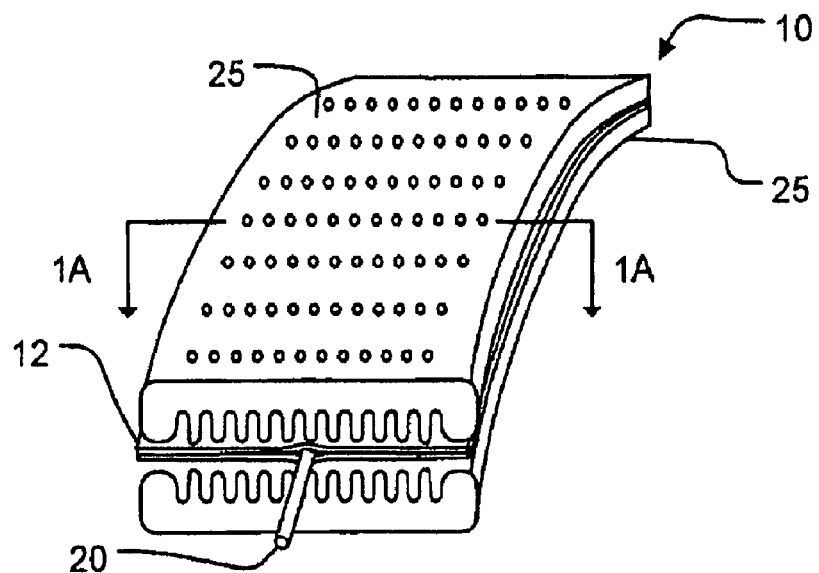
FIG. 1 is an isometric view of fuel cell apparatus according to an embodiment of the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention relates to electrochemical cell systems that include a plenum (i.e. a space capable of holding a reactant) enclosed by flexible walls. At least one of the flexible walls comprises a flexible sheet that supports one or more fuel cells. The fuel cells have anodes on a first side of the flexible sheet and cathodes on a second side of the flexible sheet. A reactant, such as fuel or an oxidant is introduced into the plenum. The fuel cells consume the reactant and generate electricity. The fuel cells preferably include a means for collecting electric current substantially in the plane of the flexible sheet and therefore do not require large areas of electrical contact to be made to inner or outer faces of the flexible sheet. The invention has particular application to fuel cells. The invention may be applied to lightweight fuel cell systems for powering portable devices.

An array of fuel cells on the flexible sheet may be provided using any suitable technology. Various suitable thin layer fuel cell structures that provide means for collecting current on the sides or ends of the structures and do not require external electrical connections to be made at major surfaces of the layer are known. For example, embodiments of the invention may be constructed using fuel cells of the types described in U.S. Patent Application Nos. 60/567,648, 11/047,560 entitled ELECTROCHEMICAL CELLS HAVING CURRENT-CARRYING STRUCTURES UNDERLYING REACTION LAYERS; 60/567,433; and 11/047,557 entitled ELECTROCHEMICAL CELLS FORMED ON PLEATED SUBSTRATES; and 11/047,558 entitled MEMBRANES AND ELECTROCHEMICAL CELLS INCORPORATING SUCH MEMBRANES and 11/185,755 entitled DEVICES POWERED BY CONFORMABLE FUEL CELLS and International Application No. PCT/IB03/00915 entitled APPARATUS OF HIGH POWER DENSITY FUEL CELL LAYER WITH MICRO STRUCTURED COMPONENTS, which are hereby incorporated by reference herein. Certain of these fuel cells can include current collecting conductors that are embedded within the fuel cell layers. This reduces or avoids the need to provide external current collecting conductors.

The term "flexible 2D fuel cell array" is used herein to refer to a flexible sheet which is thin in one dimension and which supports a number of fuel cells. The fuel cells have active areas of one type (e.g. cathodes) that are accessible from one face of the sheet and active areas of another type (e.g. anodes) that are accessible from an opposed face of the sheet. The active areas may be disposed to lie within areas on their respective faces of the sheet (e.g. it is not mandatory that the entire sheet be covered with active areas, however, the performance of a fuel cell may be increased by increasing its active area) There are various constructions which may be used to make flexible 2D fuel cell arrays. The weight of an array of fuel cells can be reduced by making the sheet thin. The efficiency of fuel cells can be improved in some cases by making the sheet thin.

A flexible 2D fuel cell array may be made up of individual unit fuel cells that are arranged two-dimensionally in any of a large number of suitable ways on an area covered by the 2D array. For example, cathode regions of individual fuel cells may be arranged to provide one or more of:

one or two or more columns of substantially parallel stripes;

shapes distributed at nodes of a two-dimensional lattice configuration (which could be a rectangular, square, triangular or hexagonal lattice, for example and which is not necessarily completely regular);

a pattern of shapes distributed in both a width and a length dimension of the area covered by the 2D array (such a pattern may be less regular than a lattice-type pattern);

or the like.

A flexible 2D fuel cell array may comprise a single sheet of a flexible material having fuel cells formed in or on the sheet.

Unit fuel cells of a flexible 2D fuel cell array may be arranged in one or more bipolar or unipolar arrays. In some embodiments, individual unit fuel cells each produce electrical current at a voltage of less than 1 volt (typically about 0.6 volts) and enough individual fuel cells are connected in series within the 2D array of fuel cells to produce a desired output voltage. Within such an array, individual unit fuel cells may be connected in a series or series-parallel arrangement to provide the desired output voltage at a suitable output power.

Connecting fuel cells in such an arrangement permits electrical power to be delivered from a 2D array of fuel cells at increased voltages and reduced currents. This, in turn, permits electrical conductors having smaller cross-sectional areas to be used to collect the electrical current for a given power output. By way of example only, fuel cells in a flexible 2D fuel cell array may be electrically interconnected in a manner as described in U.S. patent application Ser. No. 11/075,997 filed on 10 Mar. 2005 and entitled FAULT TOLERANT FUEL CELL SYSTEMS, which is hereby incorporated herein by reference.

Figure 1A:
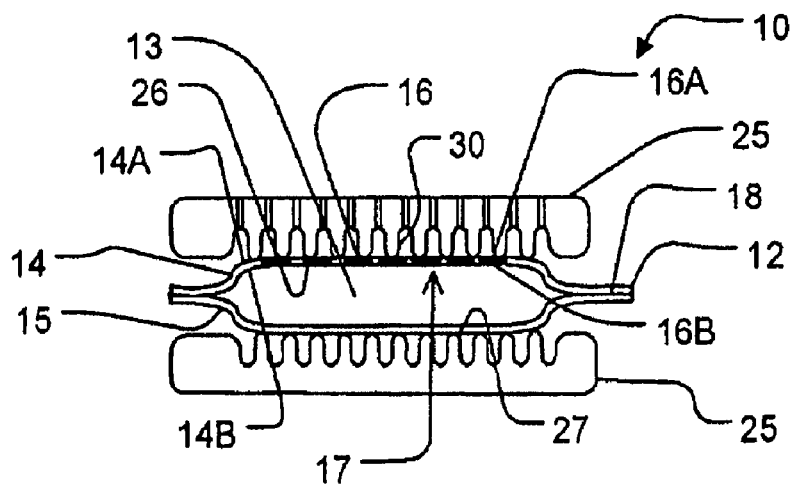
FIG. 1A is a cross section through the fuel cell apparatus of FIG. 1.
Figure 1B:
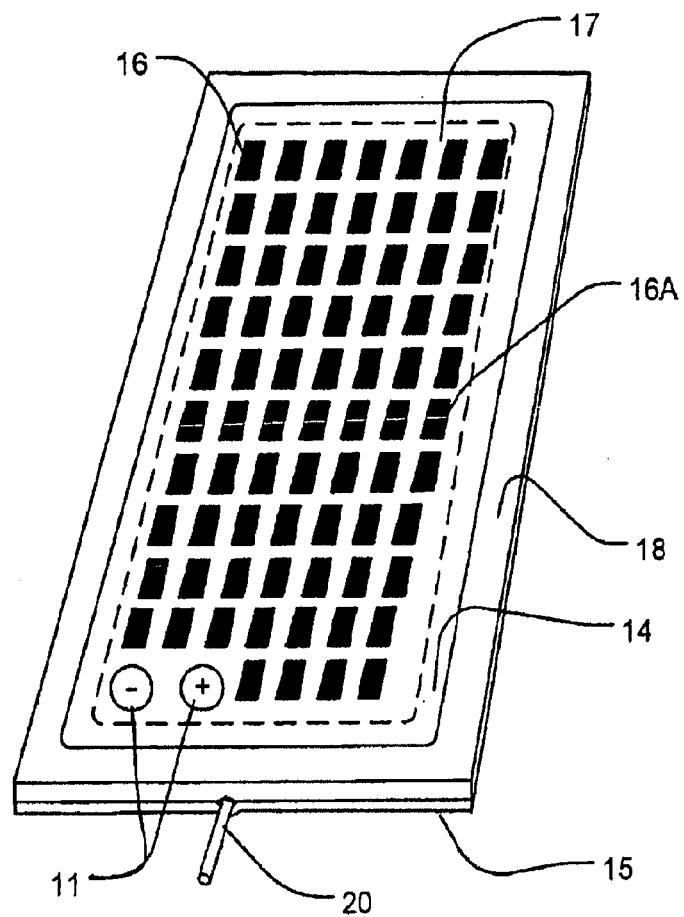
FIG. 1B is a plan view of a flexible fuel cell component according to an embodiment of the invention.

FIGS. 1 and 1A show a fuel cell system 10 according to an embodiment of the invention. System 10 includes a fuel cell component 12 that provides a plenum 13 defined between flexible sheets 14 and 15. FIG. 1B shows a fuel cell component 12. A number of unit fuel cells 16 are formed on sheet 14 or, in alternative embodiments, on both of sheets 14 and 15. Fuel cells 16 form a flexible 2D fuel cell array. Fuel cells 16 extend over an area 17 on sheet 14. Area 17 covers up to substantially all of sheet 14 in the illustrated embodiment but may be smaller in some cases.

Conductors 11 for carrying electrical power generated by fuel cells 16 to a power-consuming device are illustrated schematically in FIG. 1B. Any suitable connections may be provided to deliver electrical current to a component, circuit, etc. where the electrical current is to be put to use.

Figure 1C:
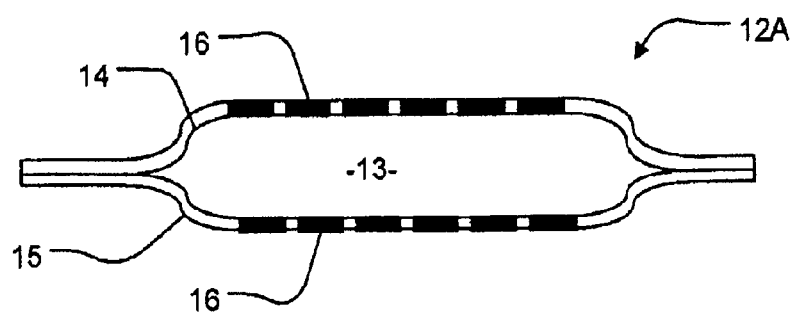
FIG. 1C is a cross section through a fuel cell component having fuel cells formed on two sheets thereof.

In some embodiments, unit fuel cells are formed on both of sheets 14 and 15. FIG. 1C shows an example fuel cell component 12A having fuel cells 16 formed on both of sheets 14 and 15.

Fuel cells 16 have cathodes 16A on a first side (in the embodiment shown in FIG. 1, outer side 14A of flexible wall 14) and anodes 16B on a second side (in the illustrated embodiment, inner side 14B of flexible wall 14). Plenum 13 is sealed around its periphery by a seal 18 that prevents any reactant in plenum 13 from mixing with another reactant in the volume surrounding fuel cell component 12.

Sheets 14 and 15 can be made very thin. For example, sheet 14 may have a thickness of 200 microns or less. Sheet 15 may be even thinner if no fuel cells 16 are provided on sheet 15. For example, sheet 15 may have a thickness of less than 100 microns. Some sheets suitable for use as a backing sheet 15 have thicknesses on the order of 25 microns. Sheet 14 needs only to be thick enough to withstand applied reactant pressures without leaking and to support fuel cells 16. Backing sheet 15 needs only to be thick enough to withstand applied reactant pressures if it does not support any fuel cells 16. Plenum 13 can also be very thin. Plenum 13 needs only to be thick enough (in a direction substantially perpendicular to sheets 14 and 15 to transport a reactant (e.g. a fuel such as hydrogen gas) to fuel cells 16. The result is that fuel cell component 12 can be very thin overall and very flexible. Fuel cell component 12 can operate while bent into any of a wide variety of configurations.

Sheets 14 and 15 may be made from any suitable materials, including suitable plastic materials that are flexible and are substantially impermeable to the reactants used by fuel cells 16. Sheets 14 and 15 are preferably not stretchable significantly in their planes under the pressures at which reactant will be supplied to plenum 13.

Figure 2:
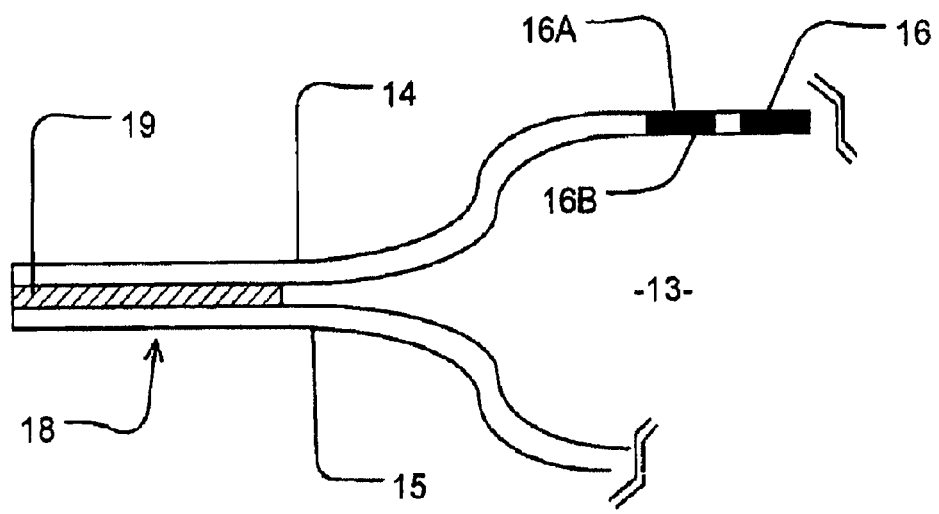
FIG. 2, is a detailed cross section through a portion of a fuel cell component including a perimeter seal having a layer of material disposed between top and backing sheets.

Seal 18 may be made in any suitable manner. For example, seal 18 may comprise an adhesive bond, a welded joint, stitching, clamps, or the like. As shown in FIG. 2, seal 18 may optionally comprise one or more layers 19 of material disposed between sheets 14 and 15. Sheets 14 and 15 may each be bonded or otherwise attached to layer 19, may be attached to one another through layer 19, or may be clamped together with layer 19 between them.

Seal 18 may be both flexible and thin. For example, seal 18, if not made directly between sheets 14 and 15 may have a thickness in the range of 25 microns to 100 microns. Plenum 13 may have a thickness the same as or similar to the thickness of seal 18.

A port 20 is provided for introducing a reactant into plenum 13. It can be appreciated that fuel cells 16 can be caused to produce electricity by introducing a fuel into plenum 13 by way of port 20 and providing an oxidant, such as air, in the volume surrounding fuel cell component 12. Port 20 may be located anywhere in the system that is convenient to the designer. In apparatus 10, port 20 is shown as extending through perimeter seal 18 between sheets 14 and 15. This is a convenient location in many cases. In other embodiments, as described below at the discussion of FIG. 8, port 20 comprises an aperture in one of sheets 14 and 15 which is in fluid connection with an aperture on an adjacent surface. Fuel or another reactant can be introduced into plenum 13 by way of port 20.

Fuel may be introduced into plenum 13 under some pressure. The pressure tends to force sheets 14 and 15 apart. An external support structure 25 is disposed to limit expansion of fuel cell component 12. Support structure 25 comprises opposing surfaces 26 and 27 that are spaced apart from one another on either side of a volume 28 that can receive fuel cell component 12. When fuel cell component 12 is located between surfaces 26 and 27 and a pressurized reactant, such as fuel, is introduced into plenum 13 then sheets 14 and 15 deform outwardly, therefore allowing plenum 13 to expand, until surfaces 26 and 27 prevent further outward deformation of sheets 14 and 15. Fuel cell component 12 is not necessarily attached to support structure 25.

At least on its surface 26 that contacts sheet 14, support structure 25 does not present a continuous impermeable surface that would block the transport of a reactant to fuel cells 16. Reactant transport pathways can be provided by one or more of:

- a porous medium through which a reactant can flow located between sheet 14 and surface 26;
- one or more apertures in surface 26;
- one or more recesses in surface 26 through which a reactant can flow and contact surface 14—the recesses may be formed between ribs or other projections on surface 26;
- one or more projections on surface 14 that prevent the closing of a gap between the rest of surface 14 and surface 26.

In the embodiment of FIG. 1, surfaces 26 and 27 comprise ribs 30. Air can flow between ribs 30 to contact cathodes 16A.

Figure 1D:
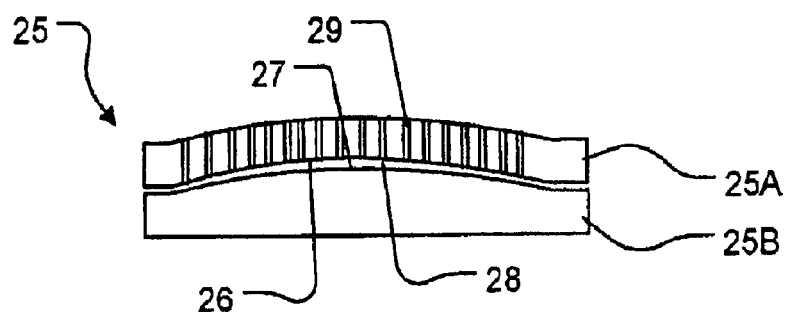
FIG. 1D is a cross section through a support structure according to an alternative embodiment of the invention.

FIG. 1D shows an alternative embodiment in which surfaces 26 and 27 on parts 25A and 25B of external support structure 25 lack ribs. Apertures 29 permit air to flow into cavity 28. In the embodiment of FIG. 1D, surfaces 26 and 27 are curved. In the alternative, surfaces 26 and 27 could be flat in one or two dimensions, could have curvature in one or two dimensions and could provide a cavity 28 that undulates in one or more directions. Depending upon the design of the apparatus in which external support structure 25 is included, a fuel cell component 12 may be placed into cavity 28 either by sliding it in between surfaces 26 and 27 or by opening one or the other of parts 25A and 25B of external support structure 25. The fuel cell component 12 (not shown in FIG. 1D) flexes to conform to the overall shape of cavity 28.

Providing a fuel cell power system in which a fuel cell component 12 is made separately from an external support structure 25 provides advantages from a design point of view. External support structure 25 can be designed in a manner that requires mechanical components only. Other factors being equal, it is generally beneficial to keep the design of external support structure 25 simple.

Some noteworthy features of the apparatus 10 illustrated in FIG. 1 include:

Volume 28 may have any of a wide range of configurations. For example, volume 28 may lie in a plane or may be curved in one or more directions.

Fuel cell components 12 of the same design may be used in combination with support structures 25 of various different configurations as long as the support structures 25 provide surfaces 26 and 27 that are spaced apart by a distance suitable for the fuel cell components 12. A fuel cell component 12 can conform with support structures 25 that have various shapes and curvatures. For example, sheets 14 and 15 may be rectangular, round, oval, or have other suitable shapes.

Fuel cell component 12 does not need to be constructed to withstand significant internal pressures in the absence of the external support provided by support structure 25. The presence of external support structure 25 prevents deformation of fuel cell component 12 in a way that could apply significant peel forces to seal 18. This permits fuel cell components 12 to be made more simply and inexpensively than would be the case if it was necessary for fuel cell component 12 to itself contain pressurized fuel without failing.

The presence of external support structure 25 permits the volume of plenum 13 to be kept small as plenum 13 is prevented from ballooning under pressures exerted by reactants in plenum 13.

Figure 4:
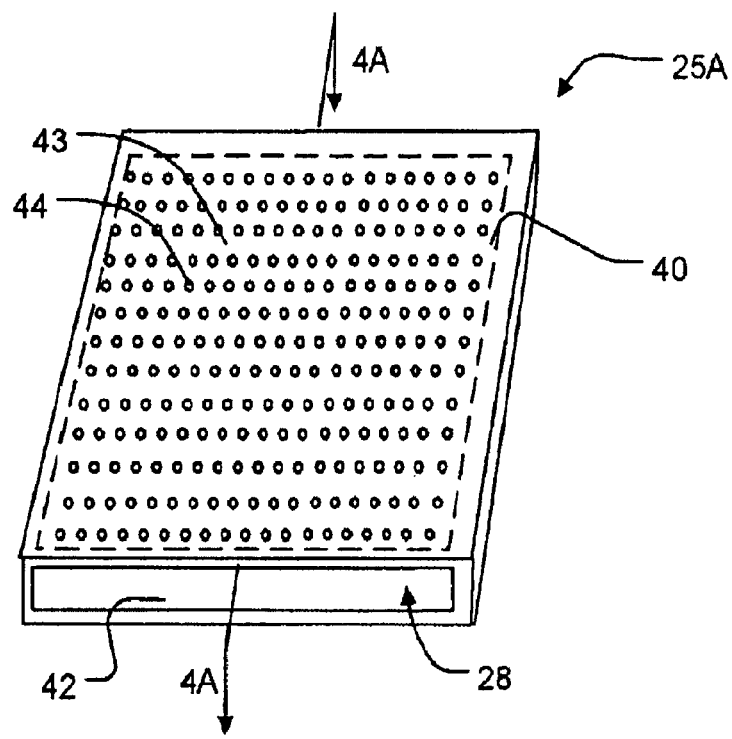
FIGS. 4 and 4A are respectively isometric and cross section views of a simple reusable external support structure.
Figure 4A:
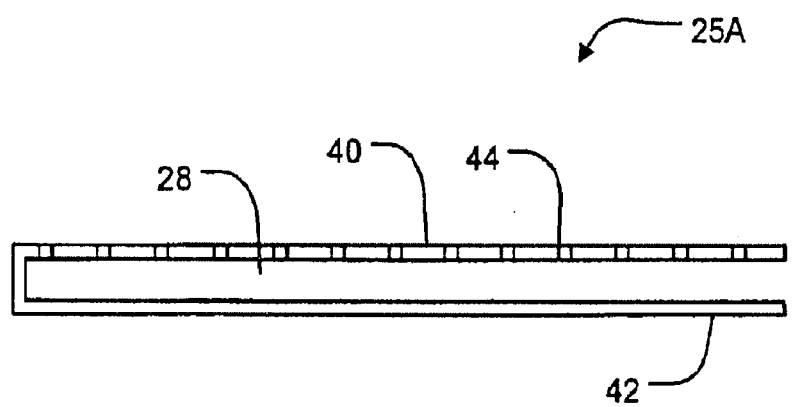
Figure 5:
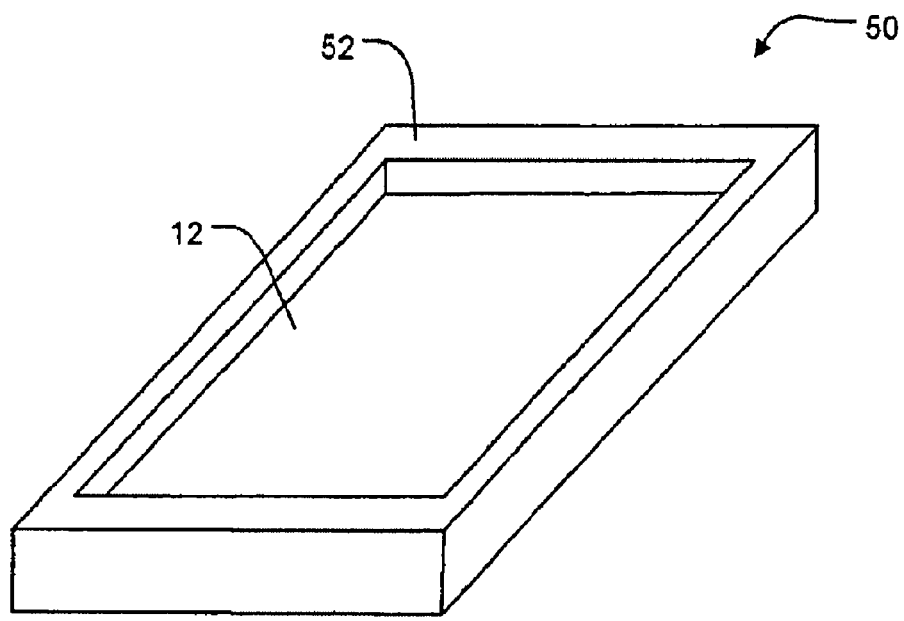
FIGS. 5 and 5A are respectively isometric and cross section views of a fuel cell apparatus having a rigid frame formed around a periphery of a fuel cell component.
Figure 5A:
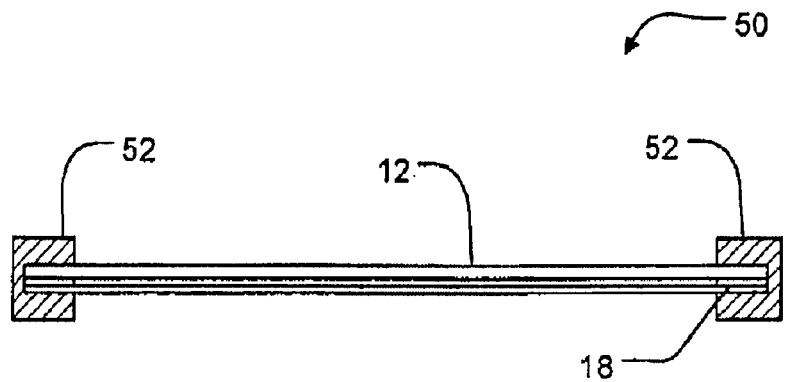
Figure 6:
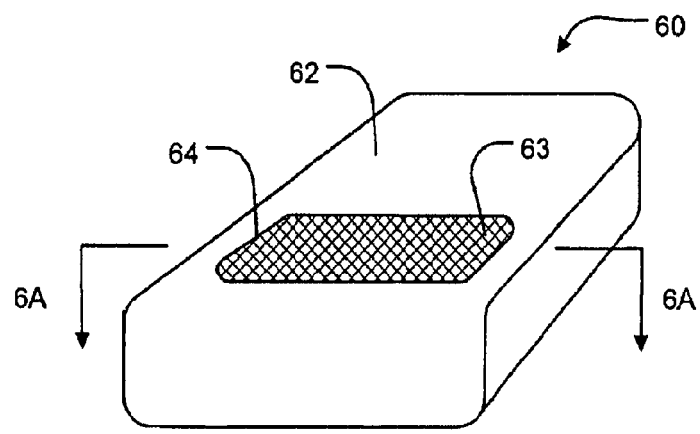
FIGS. 6 and 6A are respectively isometric and partial cross section views of an external support structure that is integrated with the housing of a portable telephone powered by a fuel cell component.

Fuel cell components 12 can be manufactured and tested independently of the device into which they will eventually be installed. For example, an external support structure 25 as shown in FIGS. 4 and 4A can be used as a test fixture for flexible fuel cell components 12. Those fuel cell components 12 that pass their tests can then be installed into structures as shown in FIGS. 5 and 5A to create stand-alone fuel cell structures, or can be installed into devices, for example as shown in FIGS. 6 to 6D. Thus fuel cell apparatus as described herein can permit considerable flexibility for manufacturing and distribution.

Standardized flexible fuel cell components 12 may be created and then integrated into end-use devices. This approach avoids any need to modify processes for manufacturing the end-use device to include explicit fuel cell fabrication and testing steps.

A fuel cell component can be made to fit into a peripheral portion of a device, thereby freeing volume in an interior cavity of a device for other uses.

Figure 3A:
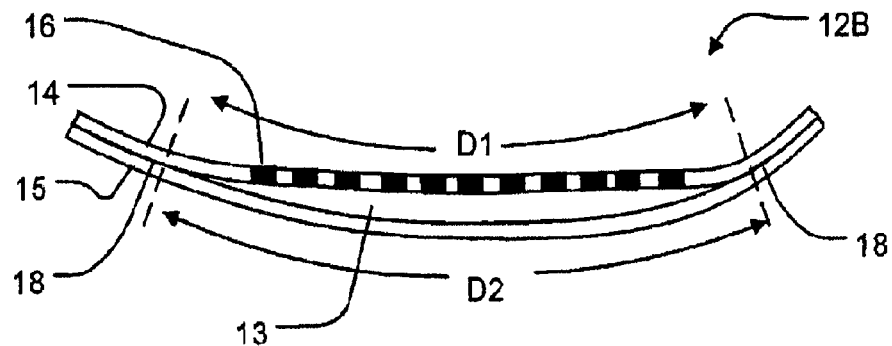
FIG. 3A is a cross section of a fuel cell component having a backing sheet that is slightly larger than a top sheet so that the fuel cell component has a curved set in the plane of the cross section.
Figure 3B:
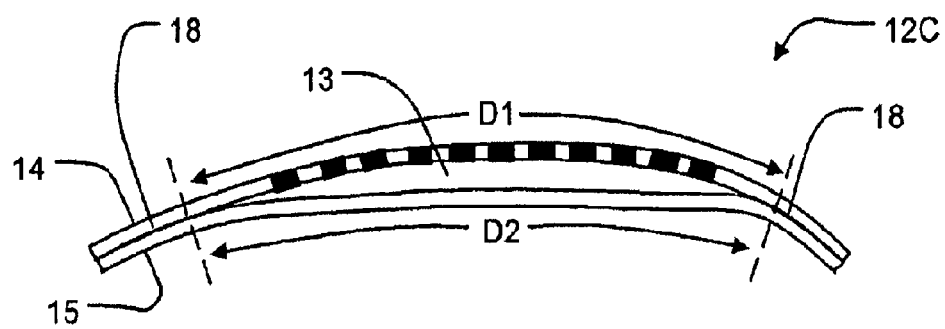
FIG. 3B is a cross section of a fuel cell component having a backing sheet that is slightly smaller than a top sheet so that the fuel cell component has a curved set in the plane of the cross section.

A preferred curvature can be imparted to fuel cell component 12 by making backing sheet 15 slightly oversized or slightly undersized relative to sheet 14 in one or two dimensions. FIG. 3A is a cross section of a fuel cell component 12B in which backing sheet 15 is slightly larger than sheet 14 so that fuel cell component 12B has a curved set which tends to make the outer face of sheet 14 concave. FIG. 3B is a cross section of a fuel cell component 12C in which backing sheet 15 is slightly smaller than sheet 14 so that fuel cell component 12C has a curved set which tends to make the outer face of sheet 14 convex.

It can be seen that in each of fuel cell components 12B and 12C, a distance D1 between opposing first and second parts of seal 18 measured along sheet 14 is different from a distance D2 between the first and second parts of seal 18 along backing sheet 15. Each of fuel cell components 12B and 12C has a curved 'set' but retains a degree of flexibility.

An external support structure 25 may take any of a wide range of forms. In each case, support structure 25 limits deformation of a fuel cell component 12. FIGS. 4 and 4A show a simple reusable external support structure 25A that is suitable, for example, for use as a test fixture for testing and performing quality control on flexible fuel cell components 12 as they are built. Support structure 25A has substantially rigid walls 40 and 42 that define a cavity 28 into which a flexible fuel cell component 12 can be inserted.

Wall 40 has a porous area 43 containing pores 44 that allow ambient air to be transported into cavity 28. A flexible fuel cell component 12 can be inserted into cavity 28 with fuel cell cathodes 16A facing wall 40. Air travels through pores 44 to reach cathodes 16A. When fuel (for example hydrogen gas or a suitable hydrocarbon-containing gas) is introduced into plenum 13 of fuel cell component 12, the sheets 14 and 15 of fuel cell component 12 will deform under the pressure exerted by the fuel gas until they contact walls 40 and 42 respectively and conform to the interior shape of cavity 28. Walls 40 and 42 prevent further deformation of fuel cell component 12.

FIGS. 5 and 5A. show a fuel cell apparatus 50 having a rigid frame 52 formed around fuel cell component 12. Frame 52 is bonded around the edge of fuel cell component 12. Frame 52 resists peel forces from being applied to perimeter seal 18 of fuel cell component 12 and resists distortion of perimeter seal 18. The central portions of sheets 14 and 15 remain flexible. Fuel cell apparatus 15 may be used on its own or in conjunction with an additional external support structure 25 (not shown in FIGS. 5 and 5A).

Figure 6A:
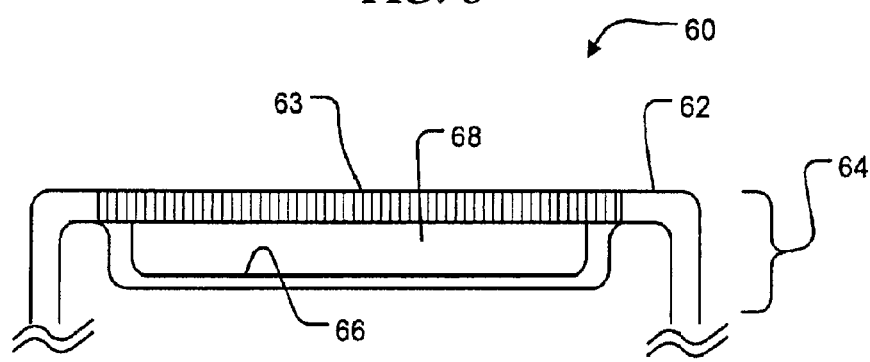

FIGS. 6 and 6A shows an external support structure that is integrated with the housing of a device 60 such as a portable telephone to be powered, at least in part, by a fuel cell component 12. Device 60 has a housing 62. Housing 62 may comprise, for example, an enclosure or part of an enclosure (such as a battery door, cover, or the like) of a device. The device may be a portable device such as a portable telephone, music player, computer, personal digital assistant, camera, radio, GPS navigation device or the like. Housing 62 may be made of plastic, for example.

External support structure 64 is defined in part by housing 62. In the illustrated embodiment, external support structure 64 comprises a shelf 66 located inside of and spaced apart from housing 62 to define a cavity 68. Shelf 66 may be formed integrally with housing 62. A portion 63 of housing 62 adjacent to cavity 68 is apertured or porous to permit air to pass to a fuel cell component 12 located in cavity 68.

The integration of fuel cells with the housing of an electrically-powered device provides the opportunity for the cathodes of the fuel cells to be in direct contact with the air in the outside environment. This reduces and/or eliminates the requirement for a plant to cause oxidant to flow through oxidant flow fields. In some embodiments of the invention, the cathodes are exposed to the environment, while the anodes and fuel plenum are located on inner surfaces of flexible fuel cell components 12.

Figure 6B:
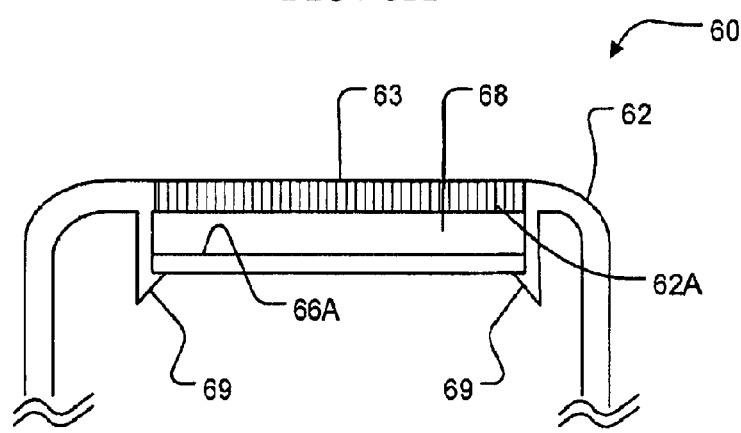
FIG. 6B is a partial cross sectional view of a device in which an external support structure includes a removable retaining plate or clip.

FIG. 6B shows a portion of a device 60 according to an alternative embodiment wherein shelf 66 is provided by a removable retaining plate or clip 66A. Retaining plate or clip 66A is detachably affixed in spaced-apart relationship to portion 63 of housing 62 by tabs 69 which project from housing 62 and engage edges of retaining plate or clip 66A.

Figure 6C:
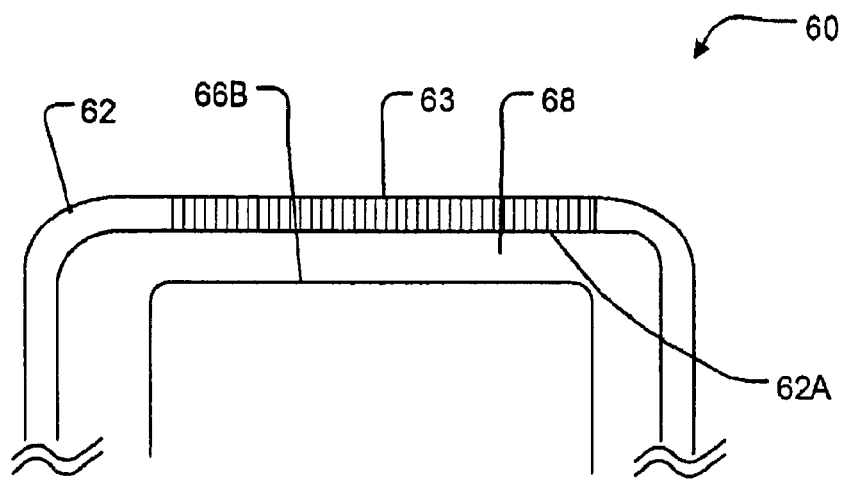
FIG. 6C is a partial cross sectional view of a device in which an external support structure includes a surface on a circuit board, fuel storage tank, or other component mounted within a housing.
Figure 6D:
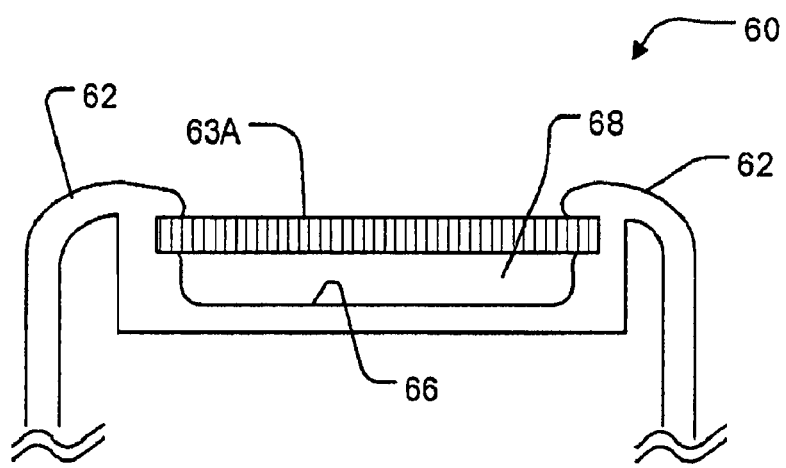
FIG. 6D is a partial cross sectional view of a device in which an external support structure includes a recessed surface on a housing of the device.

FIG. 6C shows a portion of a device 60 according to another alternative embodiment wherein shelf 66 is not attached directly to housing 62 but is provided by a suitable surface 66B on a circuit board, fuel storage tank, or other component mounted within housing 62. Surface 66B is located such that surface 66B is spaced apart from portion 63 of housing 62 to define a cavity 68 for receiving fuel cell component 12.

FIG. 6D shows a device 60 according to a further embodiment wherein a cavity 68 is formed by a recess in housing 62. A removable porous cover 63A defines an outer side of a cavity 68 while housing 62 defines an inner side of cavity 68.

It can be appreciated that in the embodiments shown in any of FIGS. 6 to 6D, external support structure 25 and cavity 68 do not take up substantial volume within device 60. When pressurized fuel gas is introduced into plenum 13, sheet 14 of fuel cell component 12 is deformed until it presses against inner surface 62A of housing 62. The entire structure can be flattened against the inner surface 62A of housing 62. The incremental volume occupied by the entire assembly can be minimal. The fuel cell power source is thus introduced with a minimal volume, providing a maximum volume remaining available for fuel storage and other components. This in turn works to maximize energy density.

The embodiments shown in FIGS. 6 to 6D are examples of ways that small portable electronic devices, such as portable telephones or digital cameras, can be designed to be powered with a fuel cell system. A person designing the housing of such a device merely needs to provide a suitable support structure 25. This can be done, for example, by providing a series of air vents and molded interior features to contain the flexible fuel cell component 12 in housing 62. Such a housing can be made using conventional technology for molding or otherwise shaping plastic or other suitable materials and does not represent any more complexity than is currently involved in making e.g. battery compartment lids.

Exposed cathodes 16A may require protection from environmental hazards. Such hazards could include, but are not limited to, excess drying, excess moisture and air pollution such as $CO_2$ sulfur compounds, or the like. Accordingly, some embodiments of the invention include means for protecting the cathodes from environmental hazards. Such means may include one or more of:

1. A carbon layer deposited within a gas diffusion layer of fuel cells 16 that is activated to absorb contaminants.
2. A hydrophobic layer deposited on the surface of fuel cells 16 that renders the cathode water-repellent.
3. A porous cover over the fuel cells 16.

These means for protecting cathodes 16A may be provided independently or in combination with one another.

Figure 7:
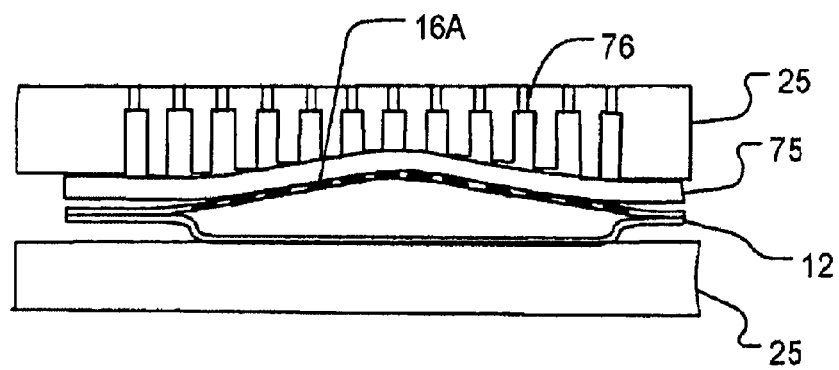
FIG. 7 is a partial cross sectional view of a fuel cell apparatus including a porous protective layer between a fuel cell component and an external support structure.

Protection for cathodes 16A may be conveniently provided by placing a porous protective layer 75 between fuel cell component 12 and external support structure 25 as shown in FIG. 7. Protective layer 75 may have one or more of:

small pores so that layer 75 acts as a filter to block particulates from reaching cathodes 16A;
hydrophobic (water repellent) properties;
components that absorb or otherwise hold water or contaminants.

In some embodiments, protective layer 75 comprises a microporous membrane such as a PTFE membrane of Goretex™ or a similar fabric. Such a membrane can prevent water from coming into contact with the cathodes 16A but permits air to diffuse to cathodes 16A and permits water vapor to diffuse out away from cathodes 16A.

Protective layer 75 is preferably replaceable. This permits differently formulated protective layers to be inserted for use in different environmental conditions. This also permits replacement of protective layer 75 if it becomes dirty or clogged. A fuel-cell-powered device may be supplied together with a plurality of different protective layers 75 for use in different environmental conditions. For example, the different protective layers 75 may be hydrophobic to different degrees.

Figure 7A:
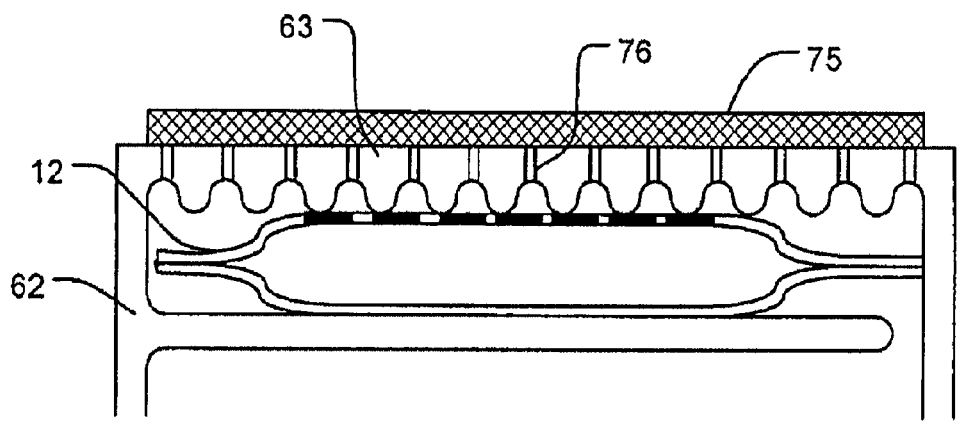
FIG. 7A is a partial cross sectional view of a fuel cell apparatus including a porous protective layer provided on an outside of an apertured portion of a housing.

FIG. 7A shows an alternative embodiment wherein a protective layer 75 is provided on an outside of an apertured portion 63 of housing 62. Ambient air must pass through protective layer 75 before it can pass through apertures 76 to reach cathodes 16A.

Figure 7B:
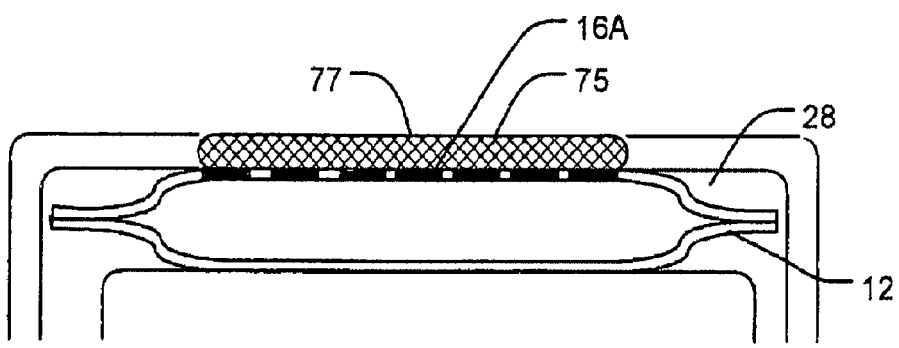
FIG. 7B is a partial cross sectional view of a fuel cell apparatus in which an external support structure includes a porous protective layer.

FIG. 7B shows a further alternative construction wherein external support structure 25 itself comprises a protective layer 75. In the illustrated embodiment, protective layer 75 is provided at least in part by a porous region 77 in the member that backs surface 26. Air reaches cathodes 16A by flowing into cavity 28 through porous region 77. Porous region 77 may be formed of a hydrophobic material such as PTFE or another hydrophobic plastic material.

Figure 8:
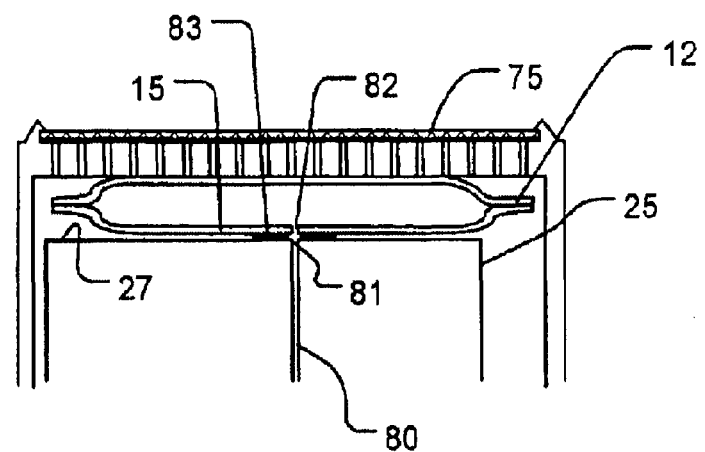
FIG. 8 is a detailed cross sectional view of a portion of a fuel cell apparatus in which a port comprises a face seal.

As noted above, port 20 may optionally comprise an aperture in one of sheets 14 and 15 which is in fluid connection with an aperture on an adjacent surface (e.g., a surface 26 or 27 of external support structure 25). FIG. 8 shows such an arrangement. A fuel store (not shown) delivers pressurized fuel to a passage 80 that passes through surface 27 of support structure 25. Passage 80 terminates at an opening 81 that lines up with an opening 82 in back sheet 15 of fuel cell component 12. A band 83 of a suitable sealant extends around openings 81 and 82. Band 83 may be made relatively wide to provide a good seal. Also, the pressure within plenum 13 of fuel cell component 12 tends to press sheet 15 against surface 27 in the vicinity of band 83.

A fuel cell component 12 may optionally comprise multiple ports 20. This allows several fuel cell components 12 to be connected to a fuel source in a daisy-chained fashion. A fuel cell component having three or more ports may serve double-duty as a power source and as a fuel distribution manifold.

Figure 9:
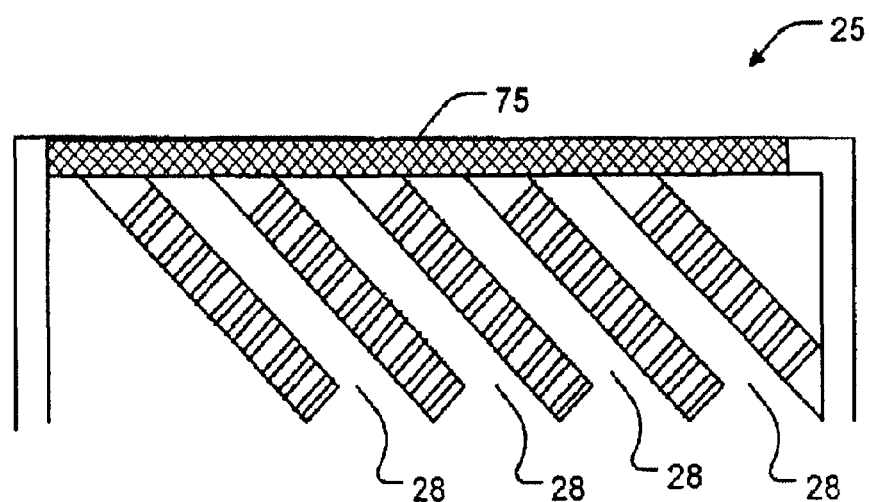
FIG. 9 shows a support structure that receives several flexible fuel cell components.

A support structure 25 may provide multiple cavities 28 to receive multiple fuel cell components 12. For example, FIG. 9 shows a support structure 25 that has cavities 28 for receiving several fuel cell components 12. A fuel line or other means is provided to supply fuel to the ports 20 of each fuel cell component 12. Each fuel cell component 12 is supported between surfaces that prevent excessive distortion when pressurized fuel is supplied to its plenum 13.

Figure 10:
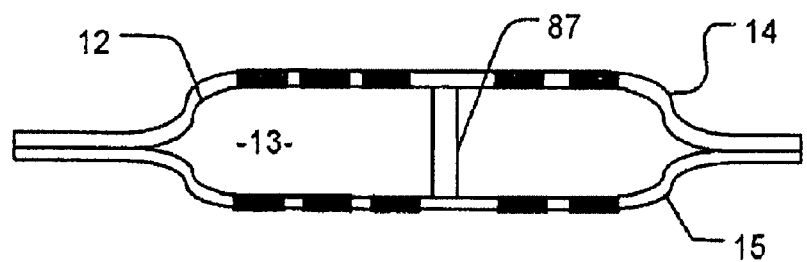
FIG. 10 shows a fuel cell component having a member that bridges between sheets within a plenum.

A fuel cell component 12 may optionally include internal structures within plenum 13. For example, FIG. 10 shows a fuel cell component 12 having a member 87 that bridges between sheets 14 and 15 within plenum 13. Member 87 both helps to hold sheets 14 and 15 spaced apart so that fuel gas can reach anodes 16B even at low pressures and also helps to reduce distortion of fuel cell component 12 at higher pressures.

Figure 10A:
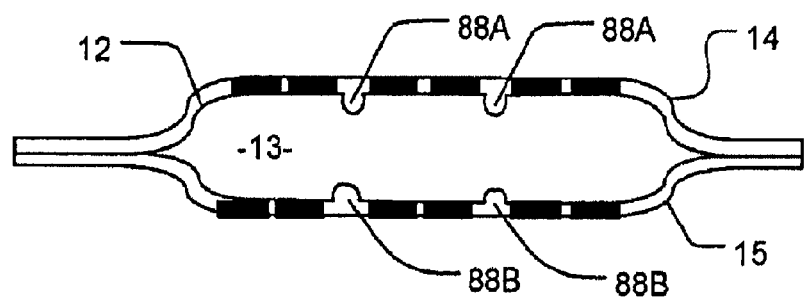
FIG. 10A shows a fuel cell component having sheets that include projections.

FIG. 10A shows a fuel cell component 12 wherein sheets 14 and 15 include projections 88A and 88B respectively. The projections serve as spacers that help to hold all areas of sheets 14 and 15 spaced apart when gas pressure within plenum 13 is low. In alternative embodiments, projections are provided on only one of sheets 14 and 15 or are absent.

Figure 10B:
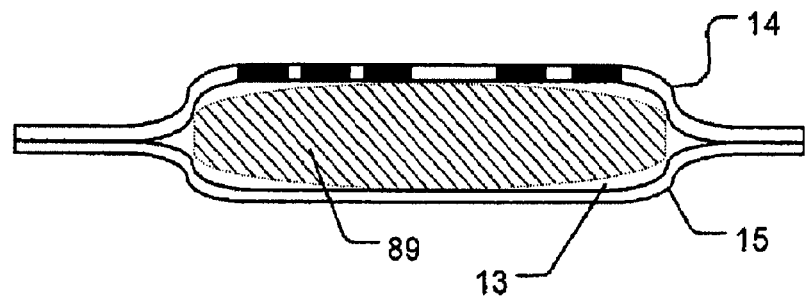
FIG. 10B shows a fuel cell component having a layer of a gas permeable material within a plenum.

FIG. 10B shows a fuel cell component 12 wherein a layer 89 of a gas permeable material is provided within plenum 13. The gas permeable material may optionally be designed to absorb contaminants from fuel gas flowing through plenum 13.

In any of the above-described embodiments, the fuel may comprise hydrogen gas. The hydrogen gas may be delivered to fuel cell components 12 at pressures above ambient pressure. The hydrogen gas may be delivered in stoichiometric quantities. Providing fuel cell components 12 in which the unit fuel cells are each very small reduces the likelihood that the fuel will be unevenly distributed over the unit fuel cells.

Fuel cell apparatus as disclosed herein can be made to be thin and to conform to the shapes of surfaces of housings 62 of devices of a wide variety of descriptions. For example, the invention has particular application in providing portable electrically-powered devices of the type which can be carried around by a person and which are powered, at least in part, by fuel cells disposed to cover or make up areas of a housing of the portable electronic device. For example, the invention may be applied to any of:

personal computing devices such as tablet or laptop computers, personal digital assistants, or the like;

entertainment devices such as radios, televisions, music players, video players, cameras, video cameras, sound recorders, or the like;

communication devices such as two-way radios, cellular telephones, satellite telephones, and the like;

safety devices such as personal alarms, flashlights, beacons, warning lights, and the like;

technical equipment such as electronic testers, oscilloscopes, frequency generators, and the like; and, small appliances such as portable vacuums, portable dust blowers, and the like.

Figure 11:
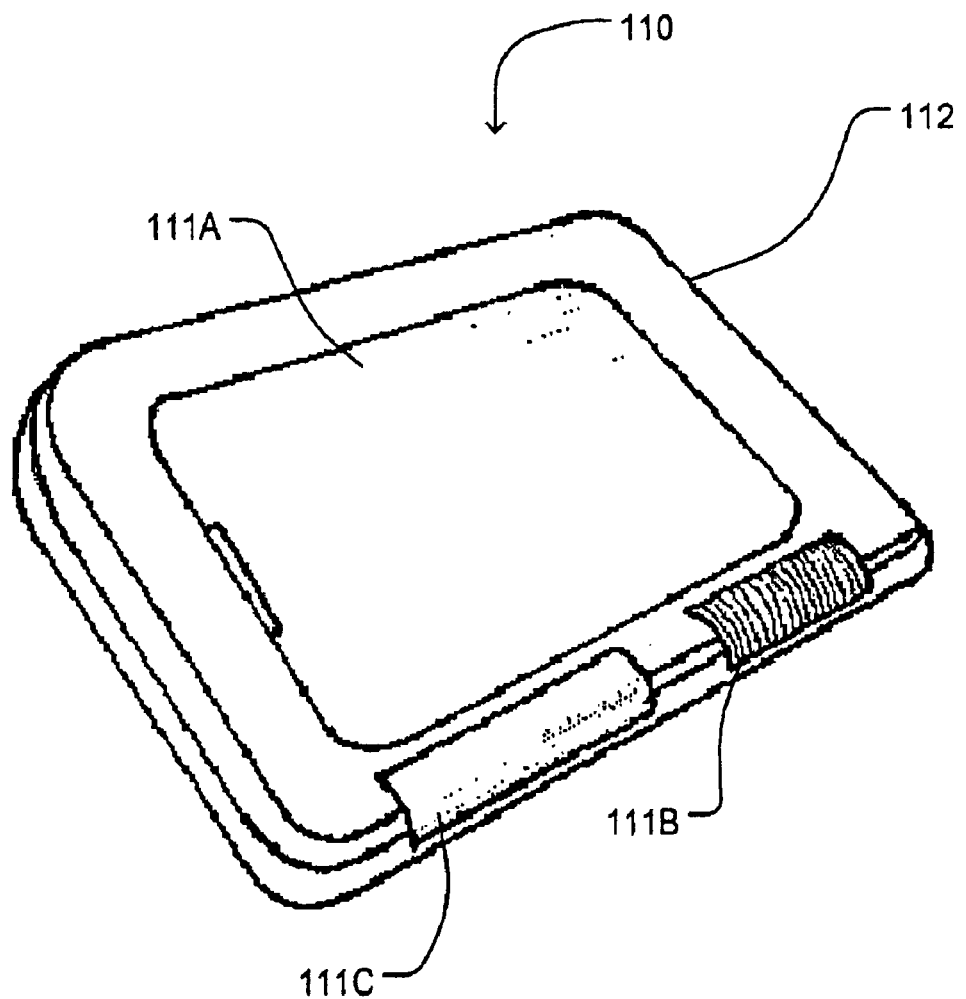
FIG. 11 is an isometric view of an electronic device having three groups of fuel cells incorporated into its housing.

For example, fuel cell systems as described herein may be integrated into a personal digital assistant (PDA) 110 as shown in FIG. 11. PDA 110 has three groups of fuel cells 111A, 111B and 111C (collectively referred to as fuel cells 111) incorporated into a cover 112. One or more of the groups of fuel cells may comprise a fuel cell component 12 and an external support surface 25 as described herein. Each group of fuel cells 111 may be similarly constructed. Fuel cells 111 may be supplied with fuel from a fuel storage unit within PDA 110. Fuel cells 111 are arranged to conform with the shape of portions of cover 112 of PDA 110.

Fuel cell systems as described herein may similarly be disposed on the back and/or sides of the lid of the clamshell case of a laptop computer.

Figure 12:
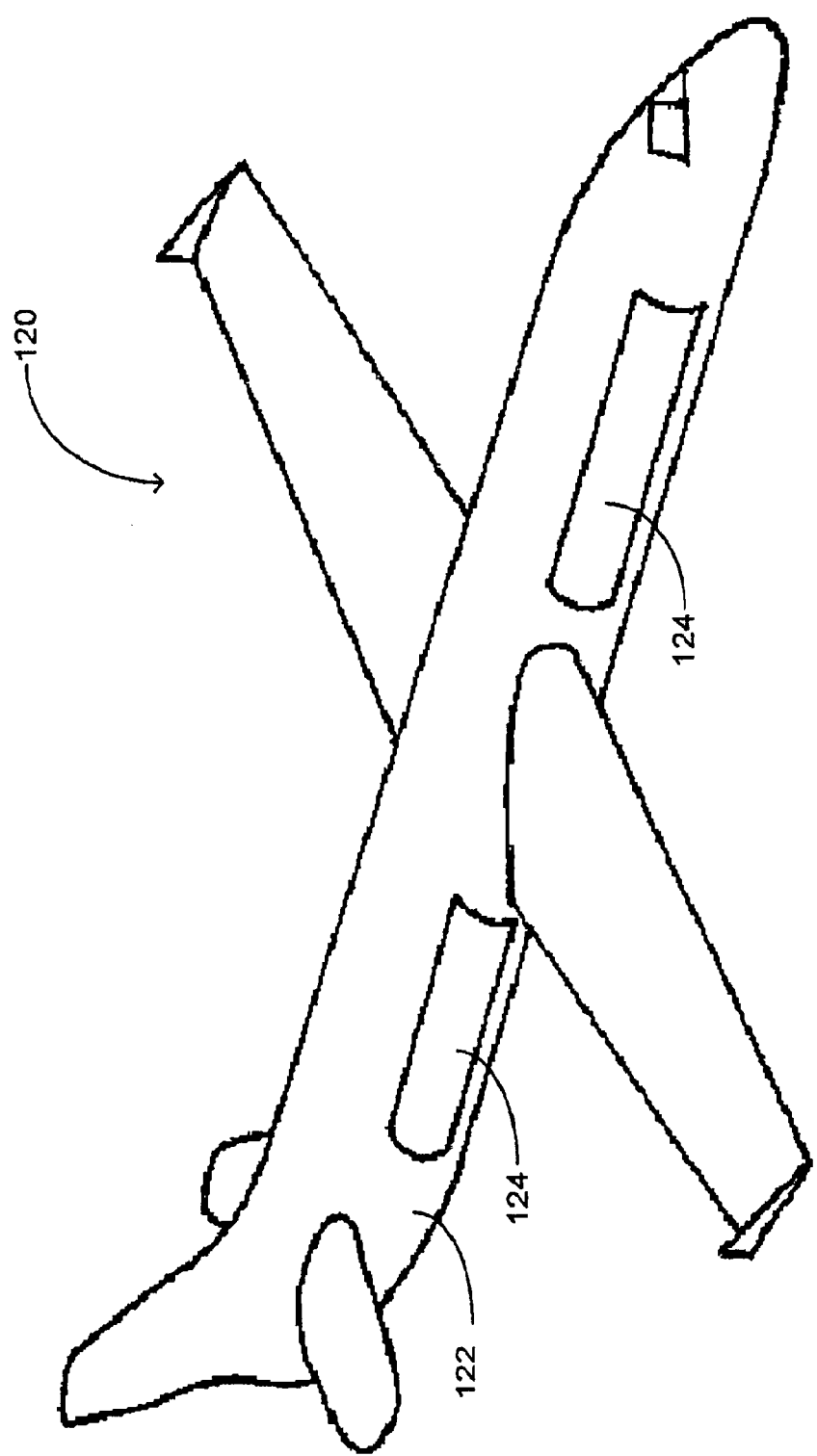
FIG. 12 is a view of an aircraft having fuel cell assemblies incorporated into its fuselage.
Figure 12A:
FIGS. 12A and 12B show an aircraft having fuel cell assemblies incorporated into its wing surfaces.
Figure 12B:
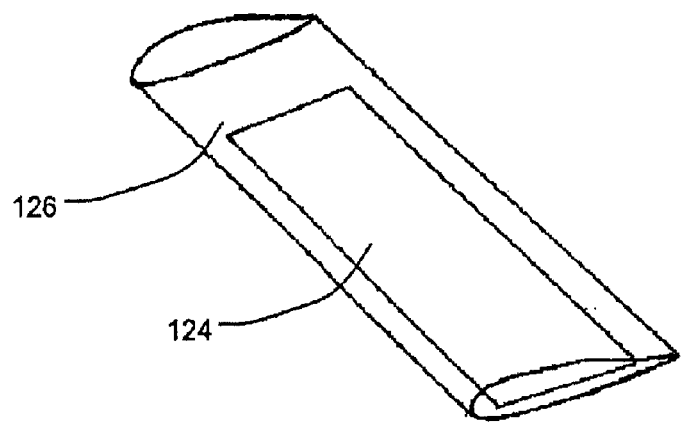

Fuel cell apparatus as described herein may also be used to supply electrical power in vehicles which include electrically-powered components. For example, FIG. 12 illustrates an aircraft 120 having fuel cell assemblies as described herein incorporated into its fuselage 122. The fuel cells are configured to be in relatively thin layers along fuselage 122. As shown in FIGS. 12A and 12B, fuel cell assemblies 124 could additionally be incorporated into the surfaces of wings 126 of aircraft 120. Such embodiments take advantage of the high air flow that is inherently associated with aircraft wings. By providing fuel cells arranged in thin layers spread out over surfaces of the aircraft the weight of the fuel cells is distributed across a large area of the wing, eliminating imbalances associated with the addition of highly concentrated point loads.

Figure 13:
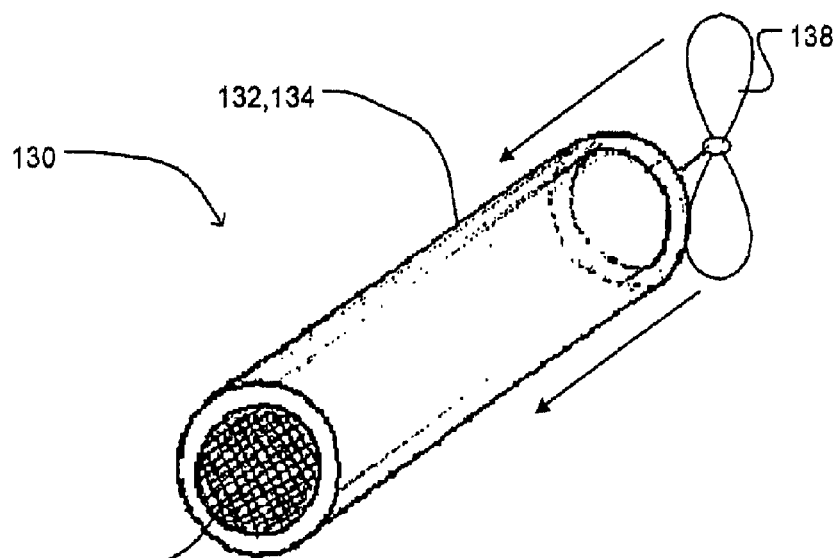
FIG. 13 is a schematic view of an electric motor having a fuel cell assemblies arranged in a cylindrical shell on a housing of the electric motor.

FIG. 13 illustrates an electric motor 130 having fuel cell assemblies 132 as described above arranged in a cylindrical shell 134 on a housing 136 of electric motor 130. A fan 138 driven by electric motor 130 may optionally be provided to increase the air flow across the cathodes of the fuel cells, resulting in increased performance levels.

Figure 14:
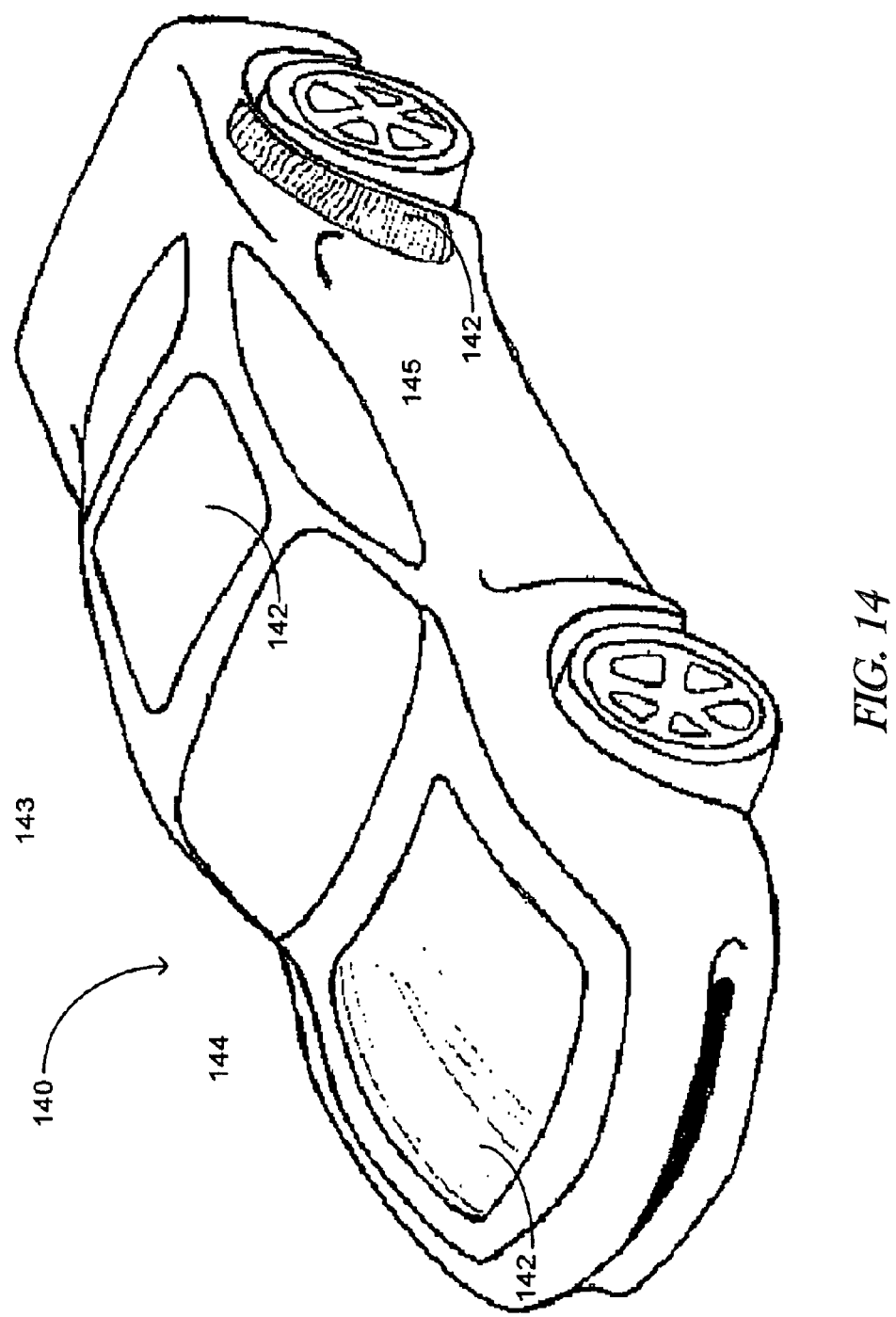
FIG. 14 shows an automobile having fuel cells assemblies incorporated into its roof, hood, and fenders.

FIG. 14 shows an automobile 140 having fuel cell assemblies 142 incorporated into its roof 143, hood 144, and fender 145. Fuel cell assemblies as described herein could also feasibly be incorporated into the bumpers, side panels, underbody, or any other part of automobile 140.

FIG. 15 illustrates a sailboat 150 having fuel cell assemblies as described herein incorporated into its mast 152 and cabin. FIG. 15A shows a portion of a mast 152 that supports a layer of fuel cell assemblies 154. FIG. 15B shows fuel cell assemblies 154 incorporated into the roof 155 of cabin 156. It can be appreciated that arrangements of fuel cells as described herein may be provided on motorboats, freighters, cruise ships, and the like. A hydrophobic layer or other such means of water protection for cathodes of fuel cell components 12 is desirable for embodiments wherein fuel cell components 12 are incorporated into water craft and cathodes of the fuel cell components are exposed.

Fuel cells may be incorporated into the structure of any device which is powered, either in part or completely, by a fuel cell system. Where the fuel cells are arranged to conform with a housing of the device in a relatively thin layer, the intrusion of the fuel cells within the envelope of the device being powered is minimized. This permits portable electrically-powered devices to be made more compact and/or permits the volume within the housing of a portable electronic device that would otherwise be occupied by batteries or another electrical power source to be used for other purposes.

Where a component (e.g. a seal, fuel cell, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, features of the example embodiments described herein may be combined in other combinations than the specific combinations that have been included for illustrative purposes herein. Accordingly, the scope of the invention is to be construed in accordance with the substance defined by the following claims.

What is claimed is:

1. A fuel cell apparatus comprising:
a plenum enclosed by flexible walls, at least one of the flexible walls including a first flexible two-dimensional fuel cell array, the array including two or more fuel cells, the fuel cells having anodes accessible from a first side of the first flexible array and cathodes accessible from a second side of the first array, wherein one but not both of the first side or the second side is accessible from within the plenum;
an inlet for connecting the plenum to a source of a reactant;
current-carrying structures embedded within the two-dimensional fuel cell array, wherein at least a portion of the current-carrying structures are disposed between the first and second sides of the first flexible array; and,
an external support structure disposed to limit outward expansion of the flexible walls.

2. The fuel cell apparatus according to claim 1 wherein the inlet comprises a fuel inlet, the cathodes of the fuel cells are accessible from an outside of the plenum, and the anodes of the fuel cells are accessible from within the plenum.

3. The fuel cell apparatus according to claim 1 wherein the plenum is defined between the first flexible array and a flexible sheet sealed to the first flexible array by a seal extending around a periphery of the plenum.

4. The fuel cell apparatus according to claim 3 wherein areas of the first flexible array and flexible sheet are different.

5. The fuel cell apparatus according to claim 3 wherein, on a cross section of the plenum, a distance between first and second opposed portions of the seal measured along the first flexible array is different from a distance between the first and second seal portions measured along the flexible sheet.

6. The fuel cell apparatus according to claim 5 wherein the distance between the first and second seal portions measured along the first flexible array is shorter than the distance between the first and second seal portions measured along the flexible sheet.

7. The fuel cell apparatus according to claim 5 wherein the distance between the first and second seal portions measured along the first flexible array is longer than the distance between the first and second seal portions measured along the flexible sheet.

8. The fuel cell apparatus according to claim 1 wherein the plenum is generally rectangular in a plane of the first flexible array.

9. The fuel cell apparatus according to claim 1 wherein the plenum is generally round in a plane of the first flexible array.

10. The fuel cell apparatus according to claim 1 wherein the inlet comprises a tube sealed between the first flexible array and the flexible sheet.

11. The fuel cell apparatus according to claim 1 wherein the inlet comprises an aperture in one of the first flexible array and the flexible sheet.

12. The fuel cell apparatus according to claim 1 comprising a gas permeable porous medium disposed between the first flexible array and the external support structure.

13. The fuel cell apparatus according to claim 1 wherein the external support structure comprises a gas-permeable porous medium.

14. The fuel cell apparatus according to claim 13 wherein the porous medium is hydrophobic.

15. The fuel cell apparatus according to claim 14 wherein the porous medium comprises a porous PTFE material.

16. The fuel cell apparatus according to claim 1 wherein the external support structure comprises a plurality of spaced-apart projections and the projections limit expansion of the plenum.

17. The fuel cell apparatus according to claim 16 wherein the projections comprise ribs.

18. The fuel cell apparatus according to claim 1 wherein the external support structure comprises openings to permit air to pass therethrough.

19. The fuel cell apparatus according to claim 1 wherein the external support structure comprises a portion of an outer housing of a portable device.

20. The fuel cell apparatus according to claim 1 wherein the external support structure comprises a portion of an outer housing of a portable device selected from the group consisting of: telephones; music players, video players, cameras, video cameras, radios, navigation devices, lights, electronic games, computers, and, personal digital assistants.

21. The fuel cell apparatus according to claim 3, wherein the flexible sheet is a second flexible two-dimensional fuel cell array.

22. The fuel cell apparatus according to claim 1, further including a gas permeable material arranged within the plenum.

23. The fuel cell apparatus according to claim 22, wherein the gas permeable material absorbs contaminants from fuel gas flowing through the plenum.

24. The fuel cell apparatus according to claim 1, wherein the flexible walls include projections within the plenum that hold the flexible walls apart.

25. The fuel cell apparatus according to claim 1, wherein the current-carrying structures embedded within the two-dimensional fuel cell array carry electrons through the array from the anodes accessible from the first side of the first flexible array to the cathodes accessible from the second side of the first flexible array.

26. The fuel cell apparatus according to claim 1, wherein a reactant is inside of the plenum.

27. The fuel cell apparatus according to claim 1, wherein at least a portion of the current-carrying structures are disposed between the anodes accessible from the first side of the first flexible array and the cathodes accessible from the second side of the first flexible array.

* * * * *

UNITED STATES PATENT AND TRADEMARK OFFICE
CERTIFICATE OF CORRECTION

PATENT NO. : 8,410,747 B2
APPLICATION NO. : 11/327516
DATED : April 2, 2013
INVENTOR(S) : McLean et al.

Page 1 of 2

It is certified that error appears in the above-identified patent and that said Letters Patent is hereby corrected as shown below:

In the Specification:

In column 2, line 34, delete "FIG. 2," and insert --FIG. 2--, therefor

In column 3, line 32, after "assemblies;", delete "and,", therefor

In column 3, line 34, delete "roof." and insert --roof;--, therefor

In column 3, line 41, after "16;", insert --and--, therefor

In column 3, line 44, delete "substrate;" and insert --substrate.--, therefor

In column 4, line 37, after "area)", insert --.--, therefor

In column 7, line 46, delete "components" and insert --component--, therefor

In column 8, line 24, delete "5A." and insert --5A--, therefor

Figure 16:
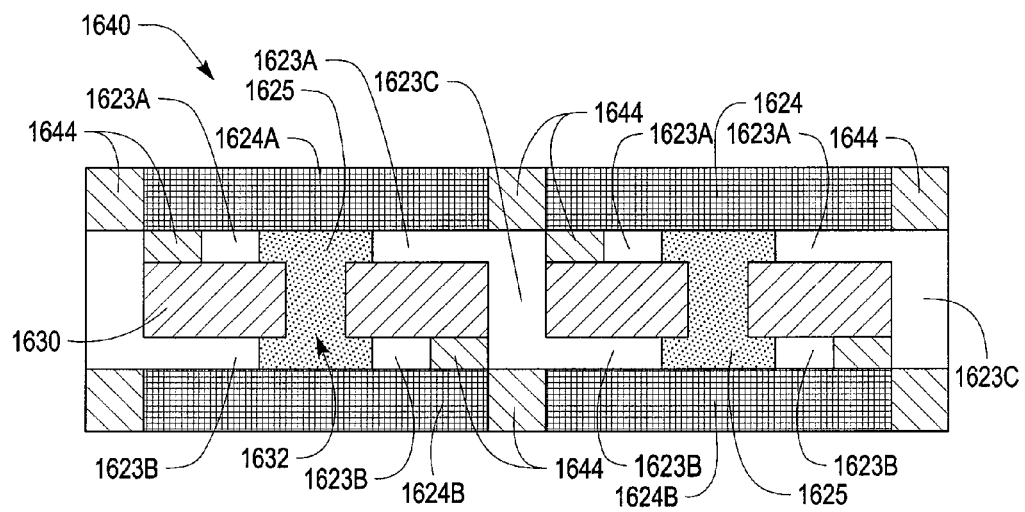
FIG. 16 is a cross section through a membrane electrode assembly of an alternative embodiment of the invention wherein unit cells are connected in series.
Figure 16A:
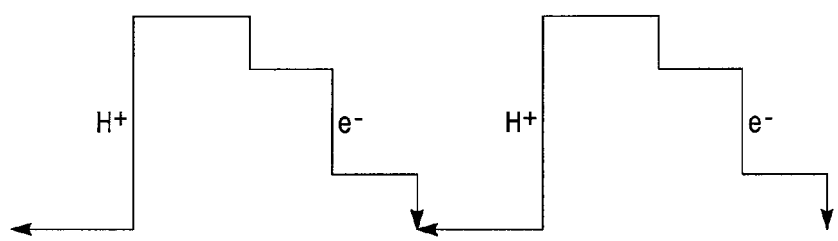
FIG. 16A is a schematic illustration showing current flow and proton flow in the membrane electrode assembly of FIG. 16.

In column 9, line 33, after "compartment lids.", insert
--Neighboring unit cells may be electrically isolated from one another. In this case it is possible to electrically interconnect the unit cells in arrangements other than parallel arrangements. Vias may be used to interconnect adjacent unit cells in series. In embodiments in which unit cells are connected in series, catalyst layers 1624A of the series connected cells are electrically isolated from one another. FIG. 16 shows a cross section through a part of an electrochemical cell layer 1640 in which a number of unit cells 1642 are connected in series. FIG. 16A illustrates schematically the paths taken by protons and electrons in the assembly of FIG. 16.
In the embodiment of FIG. 16, regions 1644 are electrically insulating. Regions 1644 may comprise a dielectric material, an air gap, or the like. Regions 1644 electrically isolate adjoining Signed and Sealed this
Twenty-fourth Day of September, 2013

Teresa Stanek Rea
*Deputy Director of the United States Patent and Trademark Office*

Figure 16B:
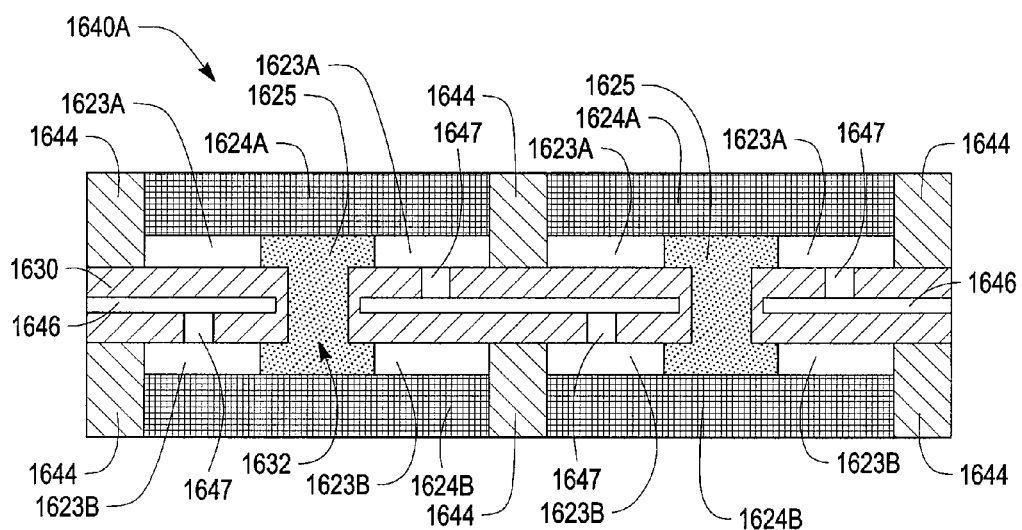
FIG. 16B is a cross section through a membrane electrode assembly in which unit cells are interconnected by current conductors embedded in a substrate.

CERTIFICATE OF CORRECTION (continued)
U.S. Pat. No. 8,410,747 B2 electrochemical unit cells from one another.
Current-carrying structure 1623A of each unit cell 1642 is connected to the current-carrying structure 1623B of the adjacent unit cell 1642 by an electrically conductive pathway 1623C which passes through a via in substrate 1630.
FIG. 16B shows an electrochemical cell layer 1640A wherein unit cells are interconnected with one another by way of electrically conducting paths 1646 embedded in substrate 1630. Conducting paths 1646 may be connected to current-carrying structures 1623A and/or 1623B by way of electrically conducting vias 1647 formed in substrate 1630. The conducting paths may be used to interconnect unit cells in series and/or in parallel with one another. A number of independent sets of conducting paths 1646 may be provided in or on substrate 1630. Electrochemical cell layer 1640A of FIG. 16B may be constructed using a multi-layer circuit board such as a flex circuit. This provides increased current-carrying capacity for the overall current collection system without reducing the surface area available for the cell reactions in the catalyst layers 1624A and 1624B.--, therefor In the Claims:

In column 14, line 12, in Claim 20, delete "telephones;" and insert --telephones,--, therefor